United States Patent [19]
Liao et al.

[11] Patent Number: 5,981,661
[45] Date of Patent: Nov. 9, 1999

[54] MODIFIED WEATHERABLE THERMOPLASTIC RESIN MOLDING COMPOSITIONS AND ARTICLES MOLDED THEREFROM

[75] Inventors: Jun Liao; Luca Pietro Fontana, both of Evansville; Kevin Mitchell Snow, Mt. Vernon, all of Ind.

[73] Assignee: General Electric Company, Pittsfield, Mass.

[21] Appl. No.: 08/920,963

[22] Filed: Aug. 29, 1997

[51] Int. Cl.⁶ .................................................... C08L 67/02
[52] U.S. Cl. .......................... 525/165; 523/436; 525/438; 525/439; 525/463; 525/464; 525/466; 525/468; 525/470
[58] Field of Search ...................... 525/438, 439, 525/463, 464, 466, 468, 470, 165; 523/436

[56] References Cited

U.S. PATENT DOCUMENTS

| | | |
|---|---|---|
| 2,465,319 | 3/1949 | Whinfield et al. . |
| 2,720,502 | 10/1955 | Caldwell . |
| 2,727,881 | 12/1955 | Caldwell et al. . |
| 2,822,348 | 2/1958 | Haslam . |
| 3,047,539 | 7/1962 | Penguilly . |
| 3,169,121 | 2/1965 | Goldberg . |
| 3,671,487 | 6/1972 | Abolins . |
| 3,953,394 | 4/1976 | Fox et al. . |
| 4,128,526 | 12/1978 | Borman . |
| 4,155,898 | 5/1979 | Bopp et al. . |
| 4,161,469 | 7/1979 | LeGrand et al. . |
| 4,161,498 | 7/1979 | Bopp . |
| 4,292,233 | 9/1981 | Binsack et al. . |
| 4,487,896 | 12/1984 | Mark et al. . |
| 4,636,544 | 1/1987 | Hepp . |
| 4,794,141 | 12/1988 | Paul et al. . |
| 4,994,532 | 2/1991 | Hawkins et al. . |
| 5,026,791 | 6/1991 | Hawkins et al. . |
| 5,112,913 | 5/1992 | Horiuchi et al. . |
| 5,116,905 | 5/1992 | Belfoure et al. .................... 525/439 |
| 5,369,154 | 11/1994 | Laughner . |
| 5,411,999 | 5/1995 | Gallucci . |
| 5,712,333 | 1/1998 | Hofmeister et al. .................. 524/409 |
| 5,784,932 | 7/1998 | Gilberti .............................. 78/813 R |

FOREIGN PATENT DOCUMENTS

| | | |
|---|---|---|
| 0 180 648 | 5/1986 | European Pat. Off. . |
| 0 284 865 | 10/1988 | European Pat. Off. . |
| 0 524 731 | 1/1993 | European Pat. Off. . |

*Primary Examiner*—Melvyn I. Marquis

[57] ABSTRACT

A flame retarded resin molding compositions with enhanced weatherable properties, which comprise a polyester and polycarbonate blend modified with an organopolysiloxane-polycarbonate and a glycidyl ester impact modifier for enhancing weatherablity and a flame retarding amount of a halogenated flame retardant.

20 Claims, No Drawings

MODIFIED WEATHERABLE THERMOPLASTIC RESIN MOLDING COMPOSITIONS AND ARTICLES MOLDED THEREFROM

FIELD OF THE INVENTION

The present invention relates to modified thermoplastic resin compositions, and, more particularly, to weatherable and impact modified compositions containing a blend of a polyester resin and a polycarbonate resin.

BACKGROUND OF THE INVENTION

Impact-modified thermoplastic resin blends that include a polyester resin, a polycarbonate resin and a glycidyl ester impact modifier are known, see, e.g., U.S. Pat. Nos. 5,112,913 and 5,369,154, and have been used to mold articles, e.g., automotive components such as mirror housings and cowl vent grilles, wherein a glossy, defect-free surface appearance is of extreme importance.

A polymer blend comprising a polyalkylene terephthalate, an organopolysiloxane-polycarbonate block copolymer, and a halogenated copolycarbonate having improved impact, heat distortion and flame retardant properties is described in U.S. Pat. No. 4,155,898 to Bopp.

U.S. Pat. No. 4,794,141 to Winfried et al. relates to molding compositions containing polydiorganosiloxane/polycarbonate block copolymers, elastomeric polymers an, if appropriate, polyalkylene terephththalates. The elastomeric polymer is described as a hydrogenated block copolymer of a vinyl aromatic monomer and a conjugated diene.

U.S. Pat. No. 4,994,532 to Hawkins et al. describes functionalized polydimethylsiloxane fluids which react with polycarbonate in the melt to form polydimethylsiloxane/polycarbonate block copolymers. The resultant copolymers are described as transparent and show improved flow.

U.S. Pat. No. 5,026,791 to Hawkins et al. relates to an aromatic carbonate polymer having a siloxane unit in the backbone of the polymer.

U.S. Pat. Nos. 4,161,498 and 4,155,898, both to Bopp, and U.S. Pat. No. 4,161,469 to LeGrand et al. describe polyalkylene terephthalate resin and an organopolysiloxane-poly-carbonate block copolymer having impact and heat distortion properties.

While articles molded from known impact-modified polyester resin/polycarbonate resin blends provide, e.g., good impact performance, the weatherability of the such articles has been found to be deficient in some applications, i.e., it is desired to retain the impact resistance after long term exposure UV radiation, especially low temperature impact resistance. Hence, it is desirable to provide a molding composition having a combination of flame resistance, impact resistance with enhanced weatherability.

SUMMARY OF THE INVENTION

It is an object of the present invention to provide flame retarded weatherable thermoplastic blend having low temperature impact and low temperature impact retention under long-term UV exposure.

Another object of the present invention is to provide flame retarded polyester resin molded articles and the molding compositions which are suitable for molded housings for devices which are used in exterior applications.

According to the present invention, there are provided flame retarded resin molding compositions with enhanced weatherable properties, which comprise a polyester and polycarbonate blend modified with an organopolysiloxane-polycarbonate and a glycidyl ester impact modifier for enhancing weatherability and a flame retarding amount of a halogenated flame retardant.

Additional ingredients may include a mineral filler, and other ingredients such as quenchers, flame retardant synergist, and antidrip additives.

DETAILED DESCRIPTION OF THE INVENTION

Polyester Resin Component

Polyesters include those comprising structural units of the following formula:

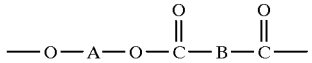

wherein each A is independently a divalent aliphatic, alicyclic or aromatic hydrocarbon or polyoxyalkylene radical, or mixtures thereof and each B is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The A radical may be, for example, a $C_{2-10}$ alkylene radical, a $C_6$–$C_{12}$ alicyclic radical, a $C_{6-20}$ aromatic radical or a polyoxyalkylene radical in which the alkylene groups contain about 2–6 and most often 2 or 4 carbon atoms. The B radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

U.S. Pat. Nos. 2,465,319, 2,720,502, 2,727,881, 2,822,348 3,047,539, 3,671,487, 3,953,394, 4,128,526

Examples of aromatic dicarboxylic acids represented by the dicarboxylated residue B are isophthalic or terephthalic acid, 1,2-di(p-carboxyphenyl)ethane, 4,4'-dicarboxydiphenyl ether, 4,4'-bisbenzoic acid and mixtures thereof. Acids containing fused rings can also be present, such as in 1,4- 1,5- or 2,6- naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof. Preferred blends of polyesters include blends that incorporate PBT and PET.

Preferred polyesters have repeating units of the following general formula:

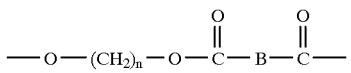

wherein n is an integer of from 2 to 6. B is a $C_6$–$C_{20}$ aryl radical comprising a decarboxcylated residue derived from an aromatic dicarboxylic acid.

Also contemplated herein are the above polyesters with minor amounts, e.g., from about 0.5 to about 10 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, or polyester-forming derivatives therefore.

The polyesters used herein have an intrinsic viscosity of from about 0.4 to about 2.0 dl/gas measured in a 60:40 phenol/tetrachloroethane mixture or similar solvent at 23°–30° C. VALOX Registered TM 315 polyester is particularly suitable for this invention having an intrinsic viscosity of 1.1 to 1.4 dl/g.

Blends of polyesters may also be employed in the composition. As indicated earlier, preferred polyesters are poly (ethylene terephthalate) and poly(1,4-butylene terephthalate). When blends of these preferred components are employed the polyester resin component can comprise from about 1 to about 99 parts by weight poly(ethylene terephthalate) and from about 99 to about 1 part by weight poly(1,4-butylene terephthalate) based on 100 parts by weight of both components combined.

Polycarbonate Resin Component

Aromatic polycarbonate resins suitable for use in the present invention, methods of making polycarbonate resins and the use of polycarbonate resins in thermoplastic molding compounds are well known in the art, see, generally, U.S. Pat. Nos. 3,169,121, 4,487,896 and 5,411,999, the respective disclosures of which are each incorporated herein by reference.

Aromatic polycarbonate resins are, in general, prepared by reacting a dihydric phenol, e.g., 2,2-bis-(4-hydroxyphenyl) propane ("bisphenol A"), 2,2-bis(3,5-dimethyl-4-hydroxyphenyl)propane, bis(2-hydroxyphenyl) methane, 2,6-dihydroxy naphthalene, hydroquinone, 4,4'-dihydroxyphenyl sulfone and 4,4'-dihydroxy-3,3-dichlorophenyl ether, with a carbonate precursor, e.g., carbonyl bromide and carbonyl chloride, a halogen formate, a bishaloformate of a dihydric phenol or a carbonate ester, e.g., diphenyl carbonate, dichlorophenyl carbonate, dinaphthyl carbonate, phenyl tolyl carbonate and ditolyl carbonate.

In a preferred embodiment, the aromatic polycarbonate resin comprises one or more resins selected from linear aromatic polycarbonate resins, branched aromatic polycarbonate resins and poly(ester-carbonate) resins.

Suitable linear aromatic polycarbonates resins include, e.g., bisphenol A polycarbonate resin.

Suitable branched aromatic polycarbonates are made, e.g., by reacting a polyfunctional aromatic compound, e.g., trimellitic anhydride, trimellitic acid, trimesic acid, trihydroxy phenyl ethane or trimellityl trichloride, with a dihydric phenol and a carbonate precursor to form a branching polymer.

Suitable poly(ester-carbonate) copolymers are made, e.g., by reacting a difunctional carboxylic acid, terephthalic acid, isophthalic acid, 2,6-naphthalic acid, or mixtures of acids, or a derivative of a difunctional carboxylic acid, e.g., an acid chloride, with a dihydric phenol and a carbonate precursor.

In a preferred embodiment, the polycarbonate resin has an intrinsic viscosity of about 0.3 to about 1.5 deciliters per gram in methylene chloride at 25° C.

In a preferred embodiment, the polycarbonate resin is a linear polycarbonate resin that is derived from bisphenol A and phosgene. In an alternative preferred embodiment, the polycarbonate resin is a blend of two or more polycarbonate resins.

Suitable aromatic polycarbonate resins are commercially available, e.g., LEXAN™ bisphenol A-type polycarbonate resins from General Electric Company.

The Siloxane-Copolycarbonate Block Copolymer

Preferred polysiloxane-polycarbonate block copolymers are set forth in copending application Ser. No. 08/062,485 entitled Polymer blends of Polycarbonate-Polysiloxane block Copolymers with Polycarbonate and Polyestercarbonate Coolymers by Hoover (Our Case 8CL-7015). The blend comprises a polysiloxane from recurring polysiloxane blocks of the formula:

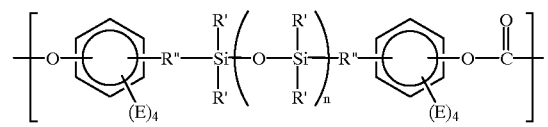

The polycarbonate-block comprises units of the formula:

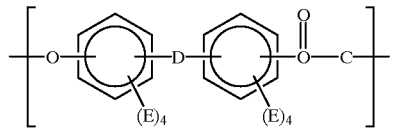

with the preferred polycarbonate-block comprises units of the formula:

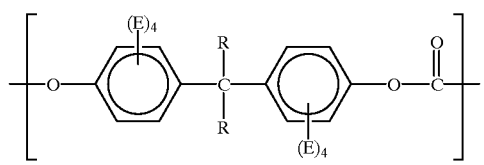

The resulting organopolysiloxane-polycarbonate block copolymer includes organopolysiloxane-polycarbonate blocks having repeating units of the general formula:

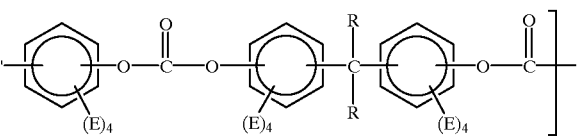

In the above formulae, R' is a member selected from the class of monovalent hydrocarbon radicals, halogenated monovalent hydrocarbon radicals and cyanoalkyl radicals; E is a member independently selected from the class of hydrogen, lower alkyl, alkoxy radicals, aryl, and alkylaryl, halogen radicals and mixtures thereof, preferably hydrogen or alkoxy and when alkoxy, preferably methoxy; R" is a divalent hydrocarbon radical, preferably an alkylene radical of from 1 to 6 carbon atoms with $C_3$ being most preferred, and n is from about 10 to about 120, preferably from about 40 to about 60.

A is a divalent hydrocarbon radical containing from 1–15 carbon atoms; —S—, —SO—, —S(O)$_2$; —O—. Preferably D is a divalent hydrocarbon radial. In the case where A is —C(R)$_2$—, R is a member selected from the class of hydrogen, cycloaliphatic, aryl, monovalent hydrocarbon radicals, aryl or alkyaryl, preferably R is alkyl, preferably C1–C6 alkyl, and more preferably methyl.

Preferred polysiloxane-polycarbonate block copolymers are set forth in copending application Ser. No. 08/062,485, filed May 14, 1993, comprise from about 1 to about 50 percent by weight of siloxane. Pages 2–14 of the above mentioned application are incorporated into the present specification by reference. These pages relate to the preferred polycarbonate-polysiloxane blocks of utilized in the present invention. Additional preferred embodiments are set forth in Ser. No. 08/068,445, filed May 27, 1993, to Hoover et al entitled Terpolymer Having Aromatic Polyester, Polysiloxane and Polycarbonate Segments, (Our Case 8CL-7001) which pages 3–14 is incorporated into the present specification by reference.

Other illustrative organopolysiloxane block copolymers are set forth in U.S. Pat. No. 4,161,498 to Bopp which describes polysiloxane blocks of the following general formulae:

ethyl propyl, chlorobutyl, cyclohexyl, etc.; R can be all the same radical or any two or more of the aforementioned radicals, while R is preferably methyl, R' includes all radicals included by R above except hydrogen, where R' also can be all the same radical or any two or more of the aforementioned R radicals except hydrogen and R' is preferably methyl. R' also includes, in addition to all the radicals included by R, except hydrogen, cyanoalkyl radicals such as cyanoethyl, cyanobutyl, etc. radicals. Radicals that are included within the definition of E are hydrogen, methyl, ethyl, propyl, chloro, bromo, etc. and combinations thereof, and E is preferably hydrogen.

The organopolysiloxane-polycarbonate block copolymers can be made by any technique known to those skilled in the art including the techniques described by Merritt, Merritt, Jr., et al., and Vaughn Jr. in the U.S. patents referenced in the description of the prior art hereinbefore. Accordingly, all of the procedures described in the aforesaid patents relating to methods for the preparation of the organopolysiloxane-polycarbonate block copolymers are incorporated herein in their entirety by reference.

Illustratively presently preferred organopolysiloxane-polycarbonate block copolymers contain repeating units of above Formula, set out herein before wherein X, Y, Z, a, n and m are as defined hereafter: Resin Type "A"; X equals about 7; Y equals about 8 to 10; Z equals about 1; a equals about 2; n equals about 10; m equals about 1. Resin Type "B"; X equals about 10; Y equals about 8 to 10; Z equals about 1; a equals about 2; n equals about 20; m equals about 1. Resin Type "C"; X equals about 5; Y equals about 8 to 10; Z equals about 1; a equals about 2; n equals about 20; m equals about 1.

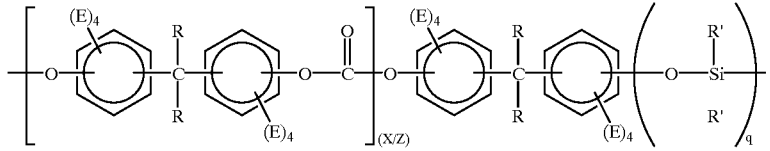

A organopolysiloxane-polycarbonate block copolymer of Bopp is represented by the following formula comprising organopolysiloxane-polycarbonate blocks having repeating units of the general formula:

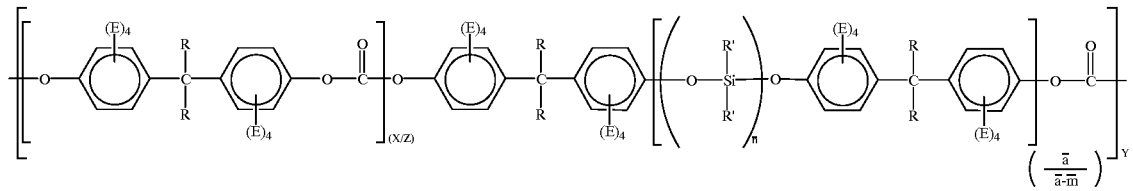

where X is an integer equal to 1 to 1000, inclusive, preferably 2 to 100, Z is equal to 1, n is a number average equal to 1 to 100, inclusive, preferably 5 to 40, a is a number average equal to 1.1 to 100, m is equal to 1, and Z is an integer equal to 1 to 1000, inclusive, preferably 5 to 12. E, R, and R' being as defined hereinafter.

Included within the radicals represented by R aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, cycloalkyl, haloalkyl including methyl, Blends of polyalkylene terephthalate resins and organopolysiloxane-polycarbonate block copolymers comprise blends of the aforesaid resins and copolymers. In general, the presently preferred blend contains at least one percent of an organopolysiloxane-polycarbonate block copolymer. Even more preferably are compositions wherein the organopolysiloxane-polycarbonate block copolymer component is present in an amount of at least about 2–50 percent, and more preferably from about 5–30 percent by weight of the composition.

Since the relative proportion of organopolysiloxane-polycarbonate block copolymer relative to the polyalkylene terephthalate resin effect the physical characteristics of the compositions the heat distortion temperature as well as the impact properties-the preferred ranges set out above have been selected since optimum heat distortion and impact properties are generally obtained within the preferred proportions noted above.

The Glycidyl Ester Impact Modifier

Suitable glycidyl ester impact modifiers are polymers that comprise repeating units derived from one or more glycidyl ester monomers. As used herein, the terminology "glycidyl ester monomer" means a glycidyl ester of an ethylenically unsaturated carboxylic acid such as, e.g., acrylic acid, methacrylic acid, itaconic acid, and includes, e.g., glycidyl acrylate, glycidyl methacrylate, glycidyl itaconate. The glycidyl ester impact modifier is preferably utilized in an amount from about 0.5 to about 10 percent of the total composition. In a preferred embodiment, the glycidal ester monomer is glycidal acrylate or glycidyl methacrylate.

In a preferred embodiment, the glycidyl ester impact modifier comprises first repeating units derived one or more glycidyl ester monomers and second repeating units derived from one or more α-olefin monomers, e.g., ethylene, propylene, 1-butene, 1-pentene.

Suitable glycidyl ester copolymers may, optionally, contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and $(C_1-C_{20})$alkyl (meth)acrylates such as, e.g., butyl acrylate, methyl methacrylate, cyclohexyl methacrylate. As used herein, the term "$(C_1-C_{20})$alkyl" means a straight or branched alkyl group of from 1 to 20 carbon atoms per group, such as e.g., methyl, ethyl, decyl, eicosyl, cyclohexyl and the term "(meth)acrylate" refers collectively to acrylate compounds and methacrylate compounds.

Suitable glycidyl ester copolymers can be made by, e.g., conventional free radical initiated copolymerization or graft polymerization methods.

In a highly preferred embodiment, the glycidyl ester impact modifier is a random copolymer having a relative composition according to structural formula:

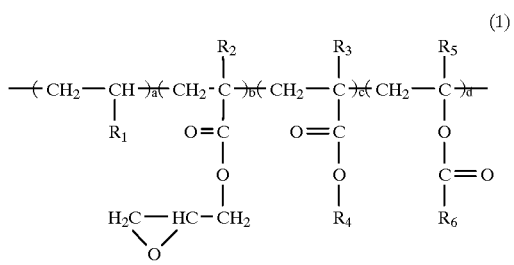

(1)

wherein:
$R_1$ is H, alkyl or aryl;
$R_2$, $R_3$ and $R_5$ are each independently H or $(C_1-C_6)$alkyl;
$R_4$ and $R_6$ are each independently alkyl or aryl;
a+b+c+d=100;
b is from 50 to 99.5;
b is from 0.5 to 25;
c is from 0 to 50; and
d is from 0 to 50.

In a more highly preferred embodiment, $R_1$ is H, $(C_1-C_{20})$ alkyl, $(C_5-C_{20})$cycloalkyl or $(C_6-C_{20})$aryl. As used herein, the term "$(C_5-C_{20})$cycloalkyl" means a cyclic alkyl group of from 5 to 20 carbon atoms per group such as e.g., cyclohexyl, cyclooctyl, and the term "$(C_6-C_{20})$aryl" means a hydrocarbon group that includes one or more unsaturated six-membered carbon rings, and may, optionally, be substituted with one or more alkyl groups on one of the aromatic rings, to form a substituent group having a total of from 6 to 20 carbon atoms per group, such as, e.g., phenyl, naphthyl, tolyl, xylyl, mesityl, isopropyl phenyl.

In a more highly preferred embodiment, $R_2$, $R_3$ and $R_5$ are each independently H or methyl.

In a more highly preferred embodiment, $R_4$ and $R_6$ are each independently $(C_1-C_{20})$alkyl.

In a more highly preferred embodiment, $R_1$ is H, $R_2$ and $R_3$ are each independently H or methyl, each $R_4$ is independently $(C_1-C_4)$alkyl, a is from 45 to 75, b is from 5 to 15, c is from 20 to 40 and d is 0.

In a preferred embodiment, the melt index, as measured at 190° C. according to ASTM D-1238, of the glycidyl ester impact modifier is from 0.1 to 100 grams/10 minutes and preferably from 0.5 to 30 grams/10 minutes.

In a preferred embodiment, the glycidyl ester impact modifier comprises one or more copolymers selected from olefin-glycidyl (meth)acrylate copolymers, olefin-vinyl acetate-glycidyl (meth)acrylate copolymers and olefin-glycidyl (meth)acrylate-alkyl (meth)acrylate copolymers.

The glycidyl ester impact modifier and polycarbonate resin are combined, preferably by melt blending, to form the glycidyl ester impact modifier/polycarbonate resin blend.

In a highly preferred embodiment, the glycidyl ester impact modifier and the polycarbonate resin are combined and subjected to mixing in the molten state, e.g., in an extruder or a continuous mixer, then shaped, e.g., by extrusion, then cooled and then reduced to particulate form, e.g., by pelletizing, to produce the glycidyl ester impact modifier/polycarbonate resin blend of the present invention.

In a first highly preferred embodiment, solid particles of the glycidyl ester impact modifier and the polycarbonate resin are pre-mixed by combining the particles and mechanically mixing the combined particles, e.g., in a drum mixer, and the resultant particulate pre-mix is then melt blended.

In an alternative highly preferred embodiment, metered amounts of solid particles of the glycidyl ester impact modifier and of the polycarbonate resin are simultaneously fed to a device for melt blending without a pre-mixing step.

In a preferred embodiment, the blend of the present invention comprises from 20 to 80 parts by weight ("pbw") more preferably from 25 to 55 pbw, of the polycarbonate resin; from 20 to 80 pbw, more preferably from 25 to 55 pbw, of the polyester resin; and from 5 to 30 pbw, more preferably from 10 to 20 pbw, of the organopolysiloxane-polycarbonate block copolymer; from 1 to 10 pbw, more preferably from 2 to 8 pbw, of the glycidyl ester impact modifier, each based on 100 pbw of the blend.

In a preferred embodiment, the glycidyl ester impact modifier is, as discussed above, combined with a first portion of the polycarbonate resin to form the glycidyl ester impact modifier/polycarbonate resin blend and the glycidyl ester impact modifier/polycarbonate resin blend is subsequently combined with the polyester resin and a second portion of the polycarbonate resin to provide the impact modified thermoplastic resin composition of the present invention.

Other ingredients

To provide desired stiffness, the reinforcing material is desirably a glass fiber reinforcing agent, mineral filler, talc, clay, mica, silica, milled or flaked glass or carbon fibers.

Preferably, glass fiber or filamentous glass is employed as a reinforcement in the present compositions. For compositions ultimately to be employed for electrical uses, it is preferred to use fibrous glass filaments comprised of borosilicate glass that is relatively soda-free. This is known as "E" glass. The filaments are made by standard processes, e.g., by steam or air blowing, flame blowing and mechanical pulling. The preferred filaments for plastic reinforcement are made by mechanical pulling. The filament diameters preferably range from about 3 to 30 microns.

The length of the glass filaments and whether or not they are bundled into fibers and the fibers bundled in turn into yarns, ropes or rovings, or woven into mats and the like are also not critical to the invention. However, in preparing the molding compositions it is convenient to use the filamentous glass in the form of chopped strands of from about 1/8" to about 1/2" long. In articles molded from the compositions on the other hand, even shorter lengths will be encountered because, during compounding considerable fragmentation will occur.

In other embodiments of the present invention, the compositions can further comprise impact modifiers. Particularly useful impact modifiers generally comprise rubbery impact modifiers. These are well known to those skilled in the art, and any of them normally employed with polyester resins may be employed herein.

The preferred impact modifiers generally comprise an acrylic or methacrylic grafted polymer of a conjugated diene or an acrylate elastomer, alone, or copolymerized with a vinyl aromatic compound. Particularly useful are the core-shell polymers of the type available from Rohm & Haas, for example, those sold under the trade designation Acryloid®. In general these impact modifiers contain units derived from butadiene or isoprene, alone or in combination with a vinyl aromatic compound, or butyl acrylate, alone or in combination with a vinyl aromatic compound. Most preferably, the impact modifier will comprise a two stage polymer having either a butadiene or butyl acrylate based rubbery core and a second stage polymerized from methylmethacrylate alone, or in combination with styrene. Also present in the first stage are cross linking and/or graft linking monomers. Examples of the crosslinking monomers include 1,3-butylene diacrylate, divinyl benzene and butylene dimethacrylate. Examples of graftlinking monomers are allyl acrylate, allyl methacrylate and diallyl maleate.

Additional preferred impact modifiers are of the type disclosed in U.S. Pat. No. 4,292,233. These impact modifiers comprise, generally, a relatively high content of a butadiene polymer grafted base having grafted thereon acrylonitrile and styrene.

Other suitable impact modifiers include, but are not limited to ethylene vinyl acetate, ethylene ethylacrylate copolymers, SEBS (styrene-ethylene-butylene styrene) and SBS (styrene-butadiene-styrene) block copolymers, EPDM (ethylene propylene diene monomer) and EPR (ethylene propylene rubber) copolymers, etc. All of these are well known to those skilled in the art and are available commercially.

In the thermoplastic compositions which contain a polyester and a polycarbonate resin, it is preferable to use a stabilizer material. Typically, such stabilizers are used at a level of 0.01–10 weight percent and preferably at a level of from 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester component, the polycarbonate with and without the particular compound and determining the effect on melt viscosity or color stability or the formation of interpolymer. The acidic phosphate salts include sodium dihydrogen phosphate, mono zinc phosphate, potassium hydrogen phosphate, calcium hydrogen phosphate and the like. The phosphites may be of the formula:

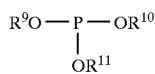

where $R^9$, $R^{10}$ and $R^{11}$ are independently selected from the group consisting of hydrogen, alkyl and aryl with the proviso that at least one of $R^9$, $R^{10}$ and $R^{11}$ is hydrogen or alkyl.

The phosphate salts of a Group IB or Group IIB metal include zinc phosphate, copper phosphate and the like. The phosphorus oxo acids include phosphorous acid, phosphoric acid, polyphosphoric acid or hypophosphorous acid.

The polyacid pyrophosphates of the formula:

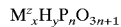

wherein M is a metal, x is a number ranging from 1 to 12 and y is a number ranging 1 to 12, n is a number from 2 to 10, z is a number from 1 to 5 and the sum of (xz)+y is equal to n+2.

These compounds include $Na_3HP_2O_7$; $K_2H_2P_2O_7$; $KNaH_2P_2O_7$ and $Na_2H_2P_2O_7$. The particle size of the polyacid pyrophosphate should be less than 75 microns, preferably less than 50 microns and most preferably less than 10 microns.

The amount of flame-retardant additive should be present in an amount at least sufficient to reduce the flammability of the polyester resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly(haloaryl acrylate), poly(haloaryl methacrylate), or mixtures thereof. Poly (haloaryl acrylate) is preferred with the most preferably being poly(pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

The flame retardants are typically used with a synergist, particularity inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Also, the final composition may contain polytetrafluoroethylene (PTFE) type resins or copolymers used to reduce dripping in flame retardant thermoplastics. Preferably other ingredients are employed in low amounts, typically less than 5 percent by weight of the total composition, and include stabilizers, mold release, lubricants, colorants, nucleants, antioxidants and UV absorbers.

Articles which are molded from the formulated resins, especially injection molded enclosures, are suitable for use in electrical communication devices such as cable connections, telephone, computer, video, etc. and network interface devices for residential, commercial and industrial.

The following examples illustrate the preparation of certain compositions within the scope of this invention. They are not to be construed to limit the invention in any manner whatsoever. All parts, except as otherwise indicated, are by weight.

Examples 1–5 and Comparative Examples A, B, C

The experimental blends were melt compounded in a 30 mm inch twin screw extruder at 300 rpm and stock temperature of approximately 250° C. to 265° C. Injection molding of test specimens was completed at 500° F. melt temperature and mold temperature was 150° F.

Flammability tests were performed with the procedure of Underwriter's Laboratory Bulletin 94 entitled "Combustion Tests for Classification of Materials, UL-94." According to this procedure, the materials were classified as either UL-94 V-0, UL-94 V-1 or UL-94 V-2 on the basis of the tests results obtained for ten samples. The criteria for each of these flammability classifications according to UL-94, are, briefly, as follows:

V-0: the average period of flaming and/or smoldering after removing the igniting flame should not exceed five seconds and none of the samples should produce drips of particles which ignite absorbent cotton.

V-1: the average period of flaming and/or smoldering after removing the igniting flame should not exceed twenty-five seconds and none of the samples should produce drips of particles which ignite absorbent cotton.

V-2: the average period of flaming and/or smoldering after removing the igniting flame should not exceed twenty-five seconds and the samples may produce drips of burning particles which ignite absorbent cotton.

Mechanical properties were measured using ASTM tests D256 (Izod), D638 (Tensile strength and elongation), D790 (Flexural strength and modulus, D3763 (biaxial or instrumented impact, also with ribbed sample), and G26 (weathering).

The siloxane-copolycarbonate coupled with glycidyl ester impact modifier for enhancing weatherablity, Examples 1–5, showed impact ductility retention at –20 degrees Centigrade after 4320 hours Xenon arc exposure. In contrast, blends of the Comparative Example A with MBS modifier lose –20 degree Centigrade ductility after 360 hours of exposure. The PBT/PC/Siloxane-PC ternary blend compositions shows good impact srrength retention after Xenon arc accelerated weathering according to ASTM G26. See Impact energy (ft-lb) –20° C. (G26/4320 hr UV) of 6.1, 7.0, 7.8, 6.9 and 7.3 for Examples 1 to 5 of the present invention as compared to 1.4 for Comparative Example A. For the Examples of the invention UL 94 was passed. Enhanced weatherablity was achieved without sacrificing favorable mechanical, processibity, shrinkage, heat distortion, properties. Impact energy was measured using biaxial impact on a single weatered chip. See Melt Viscosity MV@250° C. (poise), D3763 (biaxial or instrumented impact) DYN@-20° C., Notched Impact Strength (NI), Flexual Modulus, Flexual Strength, Tensile Break, Tensile Yield, and Tensile Elongation as set forth. The impact rib test was carried out on a 4 inch disk with a rib in the center below the point of impact. This is more demanding than the standard impact test.

Additional, properties of the M, To achieve chemical resistance to the eight Bellcore chemicals, i.e. CRC 226 Water, WD40 Walter, Rainbow 4353 Wasp & Ant Spray, 3% Sulfuric Acid, 0.2 N Sodium Hydroxide, Kerosene. Examples 1–5 show good chemical resistance to Bellcore chemicals.

| | Comparative Examples: | | |
|---|---|---|---|
| | Example A | Example B | Example C |
| PBT (wt) | 39.7 | 37.4 | 36 |
| PC (wt) | 34.9 | 36.2 | 44.6 |
| MBS (wt) | 8 | — | — |
| Siloxane-PC (wt) (36 wt % D50) | — | 14 | — |
| Lotader (wt) | 2 | — | 4 |
| EVA (wt) | 2 | 2 | 2 |
| PTFE (wt) | 0.25 | 0.25 | 0.25 |
| Br-acrylate (wt) | 8 | 6 | 8 |
| Sb2O3-EVA (wt) | 4 | 3 | 4 |
| MZP (wt) | 0.15 | 0.15 | 0.15 |
| Phosphite 168 (wt) | 0.2 | 0.2 | 0.2 |
| Irganox 1076 (wt) | 0.2 | 0.2 | 0.2 |
| Tinuvin 234 (wt) | 0.6 | 0.6 | 0.6 |
| Impact Energy (ft-lb) –20° C. (G26/0 hr UV) | 8.7 (100%) | — | — |
| Impact Energy (ft-lb), –20° C. (G26/360 hr UV) | 1.4 (0%) | — | — |
| MV @ 250° C. (poise) | 31809 | 21305 | 28646 |
| DYN @ 23 C. (ft-lb) | 32.5 (100%) | 28.0 (100%) | 34.0 (100%) |
| DYN @ –20 C. (ft-lb) | 31.4 (100%) | 32.2 (0%) | — |
| DYN @ –30 C. (ft-lb) | 35.9 (60%) | — | 38.2 (100%) |
| DYN @ –40 C. (ft-lb) | 35.7 (20%) | 34.2 (0%) | 41.6 (80%) |
| NI @ 23 C. (ft-lb/in) | 13.0 (100%) | 12.9 (100%) | 14.6 (100%) |
| NI @ –20 C. (ft-lb/in) | 12.9 (100%) | 5.8 (20%) | 5.6 (0%) |
| NI @ –30 C. (ft-lb/in) | — | 5.0 (0%) | — |
| NI @ –40 C. (ft-lb/in) | 4.8 (0%) | — | — |
| Rib-DYN @ 23° C. (ft-lb) | 30.2 (100%) | 21.8 (100%) | 28.0 (100%) |
| Rib-DYN @ –20° C. (ft-lb) | 21.0 (0%) | 11.0 (60%) | 24.7 (20%) |
| Rib-DYN @ –40° C. (ft-lb) | 18.7 (0%) | 5.1 (0%) | 7.9 (0%) |
| Flexural Modulus (psi) | 268000 | 321500 | 308400 |
| Flexural Strength (psi) | 9764 | 12070 | 11480 |
| Tensile Break (psi) | 5904 | 4744 | 7960 |
| Tensile Yield (psi) | 6576 | 8099 | 7631 |
| Tensile Elongation (%) | 82 | 14.3 | 120.6 |

| | Examples of Invention: | | | | |
|---|---|---|---|---|---|
| | Example 1 | Example 2 | Example 3 | Example 4 | Example 5 |
| PBT (wt) | 40 | 35.8 | 36 | 35.6 | 36.3 |
| PC (wt) | 30 | 34.8 | 37.6 | 32 | 35.3 |
| Siloxane-PC (wt) (36 wt % D50) | 18 | 14 | 10 | 18 | 14 |
| Lotader (wt) | 2 | 3 | 4 | 2 | 2 |
| EVA (wt) | 2 | 2 | 2 | 2 | 2 |
| PTFE (wt) | 0.25 | 0.25 | 0.25 | 0.25 | 0.25 |
| Br-acrylate (wt) | 7 | 6 | 6 | 6 | 6 |
| Sb2O3-EVA (wt) | 3.5 | 3 | 3 | 3 | 3 |
| MZP (wt) | 0.15 | 0.15 | 0.15 | 0.15 | 0.15 |
| Phosphite 168 (wt) | 0.2 | 0.2 | 0.2 | 0.2 | 0.2 |
| Irganox 1076 (wt) | 0.2 | 0.2 | 0.2 | 0.2 | 0.2 |
| Tinuvin 234 (wt) | 0.6 | 0.6 | 0.6 | 0.6 | 0.6 |
| Impact Energy (ft-lb) −20° C. (G26/0 hr UV) | 7.1 (100%) | 9.2 (100%) | 9.3 (100%) | 9.5 (100%) | 9.5 (100%) |
| Impact Energy (ft-lb), −20° C. (G26/1080 hr UV) | — | 7.9 (100%) | 9.7 (100%) | 7.4 (100%) | 7.9 (100%) |
| Impact Energy (ft-lb), −20° C. (G26/2160 hr UV) | 6.1 (100%) | 7.2 (100%) | 7.4 (100%) | 7.0 (100%) | 7.4 (100%) |
| Impact Energy (ft-lb), −20° C. (G26/3240 hrs UV) | 6.1 (100%) | 7.4 (100%) | 6.9 (100%) | 6.3 (100%) | 6.8 (100%) |
| Impact Energy (ft-lb), −20° C. (G26/4320 hrs UV) | 6.1 (100%) | 7.0 (100%) | 7.8 (100%) | 6.9 (100%) | 7.3 (100%) |
| UL 94 V-0 62 mil | pass | pass | pass | pass | pass |
| MV @ 250° C. (poise) | 17758 | 28311 | 28967 | 26550 | 27686 |
| DYN @ 23 C. (ft-lb) | 26.6 (100%) | 29.8 (100%) | 33.2 (100%) | 29.0 (100%) | 31.0 (100%) |
| DYN @ −20 C. (ft-lb) | 30.6 (20%) | 33.1 (100%) | 33.9 (100%) | 33.0 (100%) | 34.3 (100%) |
| DYN @ −30 C. (ft-lb) | 30.3 (40%) | 34.1 (100%) | 37.0 (100%) | 31.8 (80%) | 34.3 (100%) |
| DYN @ −40 C. (ft-lb) | 25.2 (0%) | 33.2 (100%) | 36.4 (100%) | 34.3 (0%) | 37.0 (20%) |
| NI @ 23 C. (ft-lb/in) | 12.7 (100%) | 14.0 (100%) | 13.3 (100%) | 13.6 (100%) | 14.2 (100%) |
| NI @ −20 C. (ft-lb/in) | 6.8 (40%) | 12.0 (100%) | 12.3 (100%) | 11.6 (100%) | 11.7 (100%) |
| NI @ −30 C. (ft-lb/in) | 4.7 (0%) | 10.0 (100%) | 6.0 (0%) | 9.0 (80%) | 6.1 (0%) |
| NI @ −40 C. (ft-lb/in) | 3.4 (0%) | 4.9 (0%) | 5.0 (0%) | 5.1 (0%) | 4.9 (0%) |
| Rib-DYN @ 23 C. (ft-lb) | — | 30.3 (100%) | 27.8 (100%) | 26.8 (100%) | 27.3 (100%) |
| Rib-DYN @ −20 C. (ft-lb) | — | 24.7 (0%) | 23.9 (0%) | 22.9 (0%) | 28.5 (20%) |
| Rib-DYN @ −40 C. (ft-lb) | — | 32.7 (0%) | 30.6 (0%) | 27.8 (0%) | 26.0 (0%) |
| Flexural Modulus (psi) | — | 285150 | 276800 | 28600 | 293500 |
| Flexural Strength (psi) | — | 10475 | 10100 | 10540 | 10850 |
| Tensile Break (psi) | 5280 | 6345 | 6150 | 6231 | 6541 |
| Tensile Yield (psi) | 7201 | 7082 | 6838 | 7151 | 7325 |
| Tensile Elongation (%) | 17.9 | 81 | 77 | 76 | 85.2 |
| HDT @ 66 psi (C.) | — | 111 | 113 | — | — |
| HDT @ 264 psi (C.) | — | 82.6 | 81.4 | 87 | 83.6 |

PBT poly(1,4-butylene terephthalate), VALOX ® resin from General Electric Company
PC bisphenol polycarbonate Lexan ® resin from General Electric Company
MBS (wt) butadiene-styrene-methyl-methacrylate core-shell rubber impact modifier EXL3691 from Rohm and Haas Company
Siloxane-PC Eugenol-capped siloxane-copolycarbonate, D + 50 and 36% by wt % siloxane (C9030B powder) from GE Silicones component of General Electric Company
Lotader ® modifier AX8900 from Elf Atochem contains 67% of ethylene, 25% of methyl acrylate, and 8% of glycidyl methacrylate
EVA ethylene vinyl acetate
PTFE polytetrafluoroethylene concentrate, 20% in polycarbonate powder
Br-acrylate Poly(pentabromobenzyl Acrylate) Mw 15,000
Sb2O3-EVA concentrate of antimony oxide in ethylene vinyl acetate 85% Sb2O3 and 15% olefinic binder
MZP zinc phosphate dihydrate
Phosphite 168 Irgafos 168 Tris(2,4-di-t-butylphenyl)phosphite, Ciba Geigy Co.
Irganox ® 1076 Antioxidant, Ciba-Geigy Company
Tinuvin ® 234 benzotriiazol UV stabilizer from Ciba-Geigy Company
( ) ___% samples tested with ductile failure

We claim:

1. A modified flame retarded resin molding composition with enhanced weatherable properties comprising a polyester resin and polycarbonate resin blend with an organopolysiloxane-polycarbonate and a glycidyl ester impact modifier for enhancing weatherablity and a flame retarding amount of a halogenated flame retardant.

2. A flame retarded resin molding composition according to claim 1 wherein said organopolysiloxane-polycarbonate copolymer comprises organopolysiloxane blocks having repeating units of the general formula:

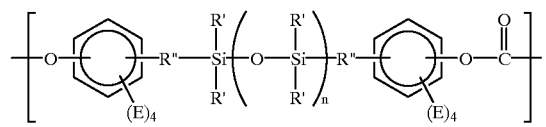

wherein R' is a member selected from the class of monovalent hydrocarbon radicals, halogenated monovalent hydrocarbon radicals and cyanoalkyl radicals; E is independently selected from the group consisting of hydrogen, lower alkyl, alkoxy radicals, aryl, and alkylaryl, halogen radicals and mixtures thereof, and R" is a divalent hydrocarbon radical, and n is from about 10 to about 120.

3. A flame retarded resin molding composition according to claim 2 wherein said organopolysiloxane-polycarbonate copolymer additionally comprises polycarbonate blocks having repeating units of the general formulae:

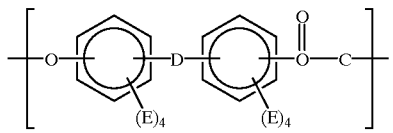

and D is a divalent hydrocarbon radical containing from 1–15 carbon atoms; —S—, —SO—, —S(O)$_2$, or —O—.

4. A flame retarded resin molding composition according to claim 3 wherein said organopolysiloxane-polycarbonate copolymer additionally comprises polycarbonate blocks having repeating units of the general formulae:

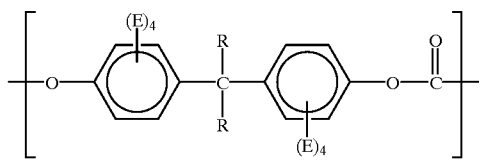

wherein R is a member selected from the class of hydrogen, cycloaliphatic, aryl, monovalent hydrocarbon radicals, aryl or alkyaryl.

5. A flame retarded resin molding composition according to claim 1 wherein said organopolysiloxane-polycarbonate copolymer comprises organopolysiloxane blocks having repeating units of the general formulae:

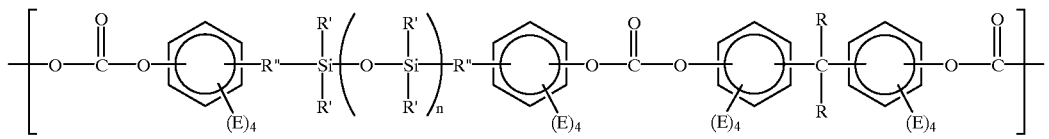

wherein R is independently selected from the group consisting of aryl radicals, halogenated aryl radicals, aralkyl, aliphatic, haloaliphatic and cyclo-aliphatic radicals; R' is selected from the group consisting of monovalent hydrocarbon, halogenated monovalent hydrocarbon and cyanoalkyl radicals; R" is a divalent hydrocarbon radical; E is independently selected from the group consisting of hydrogen, lower alkyl, alkoxy, aryl, alkylaryl, halogen radicals and mixtures thereof; and n is from about 10 to about 120.

6. A flame retarded resin molding compositions according to claim 5.

7. A flame retarded resin molding compositions according to claim 1 wherein said glycidyl ester impact modifier comprises first repeating units derived from one or more glycidyl ester monomers and second repeating units derived from one or more α-olefin monomers.

8. A flame retarded resin molding compositions according to claim 1 wherein said glycidyl ester impact modifier comprises from 0.5 to 10 wt. % of the flame retarded resin molding composition and is derived from a glycidyl ester monomer.

9. A flame retarded resin molding compositions according to claim 1 wherein said glycidyl ester impact modifier is a random copolymer having a composition according to structural formula:

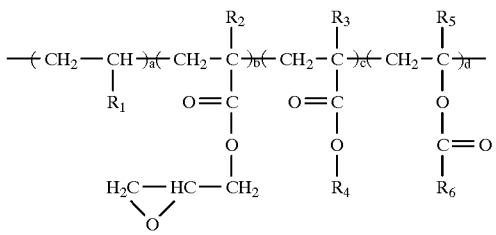

wherein: $R_1$ is H, alkyl or aryl; $R_2$, $R_3$ and $R_5$ are each independently H or $(C_1-C_6)$ alkyl; $R_4$ and $R_6$ are each independently alkyl or aryl; $a+b+c+d=100$; a is from 50 to 99.5; b is from 0.5 to 25; c is from 0 to 50; and d is from 0 to 50.

10. A flame retarded resin molding compositions according to claim 1 wherein said polyester has repeating units of the following general formula:

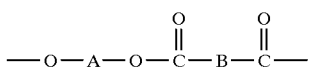

wherein each A is independently a divalent aliphatic, alicyclic or aromatic hydrocarbon or polyoxyalkylene radical, or mixtures thereof and each B is independently a divalent aliphatic, alicyclic or aromatic radical, or mixtures thereof.

11. A flame retarded resin molding composition according to claim 1 wherein the polycarbonate is an aromatic polycarbonate resin and is selected from linear aromatic polycarbonate resins, branched aromatic polycarbonate resins or aromatic polyester-carbonate resins.

12. A flame retarded resin molding compositions according to claim 1 wherein said polycarbonate comprises a linear aromatic polycarbonate resin.

13. A flame retarded resin molding compositions according to claim 1 wherein said polycarbonate comprises a poly(ester carbonate).

14. A flame retarded resin molding compositions according to claim 1 wherein the resin comprises from 20 to 80 parts by weight of the polycarbonate resin; from 20 to 80 parts by weight of the polyester resin; from 5 to 30 parts by weight of the organopolysiloxane-polycarbonate block copolymer; and from 1 to 10 parts by weight of the glycidyl ester impact modifier, each based on 100 parts by weight of the blend.

15. A flame retarded resin molding compositions according to claim 1 wherein the resin comprises from 25 to 55 parts by weight, of the polycarbonate resin; from 25 to 55 parts by weight of the polyester resin; from 10 to 20 parts by weight of the organopolysiloxane-polycarbonate block copolymer; and from 2 to 8 parts by weight of the glycidyl ester impact modifier, each based on 100 parts by weight of the blend.

16. A flame retarded resin molding composition according to claim 1 wherein said flame retardant is a halogenated epoxy, poly (haloarylmethacrylate), halogenated polystyrene or a poly(haloarylacrylate) flame retardant.

17. A flame retarded resin molding composition according to claim 1 wherein said flame retardant is a polybromobenzylacrylate flame retardant.

18. An article molded from the composition of claim 1.

19. A molded article according to claim 18 comprising an injection molded article.

20. A molded article of claim 19 wherein the injection molded article is an enclosure selected from the group consisting of cable connectors, telephones, computers, videos, and network interface devices utilized for residential, commercial or industrial applications.

* * * * *